United States Patent [19]

Berti

[11] Patent Number: 5,800,328

[45] Date of Patent: Sep. 1, 1998

[54] METHOD OF AND DEVICE FOR FOLDING A GAS BAG OF A VEHICLE OCCUPANT RESTRAINT SYSTEM

[75] Inventor: Dietmar Berti, Schechingen, Germany

[73] Assignee: TRW Occupant Restraint Systems GmbH, Alfdorf, Germany

[21] Appl. No.: 805,186

[22] Filed: Feb. 27, 1997

Related U.S. Application Data

[63] Continuation-in-part of Ser. No. 559,192, Nov. 13, 1995, abandoned.

[30] Foreign Application Priority Data

Nov. 15, 1994 [DE] Germany .................. 44 40 845.5

[51] Int. Cl.$^6$ .................................................. B31B 1/26
[52] U.S. Cl. .................. 493/405; 493/454; 493/940; 280/728.1
[58] Field of Search .................. 493/243, 254, 493/260, 261, 267, 314, 405, 406, 450, 451, 454, 458, 940; 53/116, 117, 118, 429, 430; 280/728.1, 743.1; 242/532.5, 586.3, 586.5, 529, 910; 426/111

[56] References Cited

U.S. PATENT DOCUMENTS

| | | | |
|---|---|---|---|
| 2,815,883 | 12/1957 | Robins et al. | 426/111 |
| 2,942,794 | 6/1960 | Huso | 242/397 |
| 3,010,372 | 11/1961 | Lanford | 493/405 |
| 3,839,947 | 10/1974 | Kornas et al. | 493/244 |
| 3,839,948 | 10/1974 | Putti et al. | 493/244 |
| 3,848,821 | 11/1974 | Scheel | 242/55 |
| 4,173,356 | 11/1979 | Ross . | |
| 4,767,394 | 8/1988 | Ito et al. | 493/454 |
| 5,022,675 | 6/1991 | Zelenak, Jr. et al. | 280/743.1 |
| 5,290,061 | 3/1994 | Bollaert | 280/743.1 |
| 5,300,011 | 4/1994 | Budde et al. | 493/405 |
| 5,360,387 | 11/1994 | Baker | 493/405 |
| 5,375,393 | 12/1994 | Baker et al. | 53/429 |
| 5,391,137 | 2/1995 | DePoy et al. | 493/405 |
| 5,456,651 | 10/1995 | Baker et al. | 493/405 |
| 5,492,367 | 2/1996 | Albright et al. | 280/728.1 |
| 5,547,218 | 8/1996 | Kuretake et al. | 280/743.1 |
| 5,690,358 | 11/1997 | Marotzke . | |

FOREIGN PATENT DOCUMENTS

| | | |
|---|---|---|
| 0370613A1 | 5/1990 | European Pat. Off. . |
| 0443485A1 | 8/1991 | European Pat. Off. . |
| 0671296A2 | 9/1995 | European Pat. Off. . |
| 0734911A1 | 10/1996 | European Pat. Off. . |
| 2251493 | 5/1973 | Germany . |
| 2524770A1 | 12/1976 | Germany . |
| 4227559A1 | 2/1994 | Germany . |
| 4343026A1 | 6/1994 | Germany . |
| 4422276C2 | 7/1996 | Germany . |
| 19516494 | 10/1996 | Germany . |
| 58-049541 | 3/1983 | Japan . |
| 3279053 | 3/1990 | Japan . |
| 2291363 | 12/1990 | Japan . |
| 3167048 | 7/1991 | Japan . |
| 585292 | 9/1991 | Japan . |
| 446842A | 2/1992 | Japan .................. 280/743 |
| 08127301A | 5/1996 | Japan . |

Primary Examiner—Michael J. Carone
Assistant Examiner—Darren Ark
Attorney, Agent, or Firm—Tarolli, Sundheim, Covell, Tummino & Szalo

[57] ABSTRACT

A gas bag (5) for a vehicle occupant protection system, which when inflated is three-dimensional in shape, is folded from a deflated, flattened and spread-out condition. The gas bag (5) has a rear wall with a securing section (SS) featuring an inflation port (20), a front wall section (OS) opposite thereto and a junction section (JS) between the two wall sections. The gas bag (5) is folded into a shape adapted to the interior space of a receiving compartment (RC). The folding of the gas bag (5) is done substantially by rotating the junction section (JS) relative to the securing section (SS).

2 Claims, 1 Drawing Sheet

METHOD OF AND DEVICE FOR FOLDING A GAS BAG OF A VEHICLE OCCUPANT RESTRAINT SYSTEM

This application is a continuation-in-part of U.S. application Ser. No. 08/559,192, filed Nov. 13, 1995 now abandoned.

BACKGROUND OF THE INVENTION

1. Technical Field

The present invention relates to a method of and a device for folding a gas bag of a vehicle occupant restraint system for accommodation in a receiving compartment.

2. Description of the Prior Art

In the prior art, the gas bag for a vehicle occupant restraining system is ordinarily folded manually. Typically, the gas bag is secured to a securing plate surrounding the gas bag inflation port and is spread out on a folding table in a deflated, flattened condition. Then, folding paddles separately hinged on a stand are pivoted down one after the other onto the spread-out gas bag, and the gas bag is folded over each folding edge formed by these folding paddles. Due to the sequence of hinging down the corresponding folding paddles and folding the gas bag accordingly, the gas bag is translated from its original, spread-out shape into a folded shape, in which it can be deposited in the interior space of a receiving compartment. On completion of folding, the folding paddles are withdrawn from the folded gas bag.

This method according to the prior art, which may be employed for gas bags on both the driver's side and the front passenger's side, has several drawbacks. First, actuating the folding paddles is an activity which is ergonomically difficult. Furthermore, there is the risk in using the folding paddles that the gas bag is damaged during folding should the folding paddles have a sharp edge. Finally, such a method of folding, necessitating roughly 20 steps in folding, is a time-consuming operation. Known folding methods take up between 2 and 4 minutes depending on the size and the way in which the gas bag is mounted.

More recently, automated folding devices were proposed which operate with complicated three-dimensional folding movements, thus eliminating the folding paddles. Unwanted fabric folds which are eliminated manually when folding is done by hand, are eliminated in automatic folding by a combined action of compressed air and vacuum. However, these automated folding methods are able to reduce the time needed for folding only slightly. In addition, the devices are highly expensive due to the relatively complicated sequence of movements needed in folding.

The object of the present invention is to substantially reduce the processing time needed in folding a gas bag.

SUMMARY OF THE INVENTION

According to the present invention, a method of folding a gas bag for a vehicular occupant restraint system is provided. The gas bag, in an inflated state, has a three-dimensional shape and, when deflated, flattened and spread-out in a plane, has a rear wall section with a central wall zone wherein an inflation opening is defined. A front wall section lies opposite the rear wall section and a connecting wall section, termed herein as a junction section, interconnects peripheral zones of the rear and front wall sections. In the inventive method, the rear and front sections are rotated with respect to each other about an axis substantially normal to the plane on which the bag is spread-out.

By employing a turning movement instead of a plurality of folds to be made in sequence about separate folding lines, the complete procedure may be implemented essentially in a single step which substantially reduces the processing time needed.

In the preferred embodiment, relative rotation between the rear and front wall sections is achieved by holding stationary the central wall zone and rotating the junction section. Preferably, the junction section is clamped at an outer periphery thereof at a plurality of circumferentially spaced clamping locations and the central wall zone is engaged and held for relative rotation with respect to the junction section. In addition, the junction section, which is engaged at the clamping locations, is moved radially inwardly towards the inflation opening while the rear and front wall sections are rotated with respect to each other.

A device according to the invention for implementing the method is also provided. The device comprises holding means for holding the central wall zone, clamping means for engaging the junction section at circumferentially spaced locations thereof, and rotating means for rotating the holding means and clamping means relative to each other about an axis substantially normal to the plane in which the bag is spread-out. In the preferred embodiment of the device the holding means is stationary and the clamping means are rotated by the rotating means. Preferably, the device comprises moving means for moving the clamping means radially inwardly towards the inflation opening while the holding and clamping means are rotated with respect to each other.

BRIEF DESCRIPTION OF THE DRAWINGS

The advantages and features of the invention will be evident in particular from the following description with reference to the enclosed drawings in which.

DETAILED DESCRIPTION OF A PREFERRED EMBODIMENT

Figure 1:
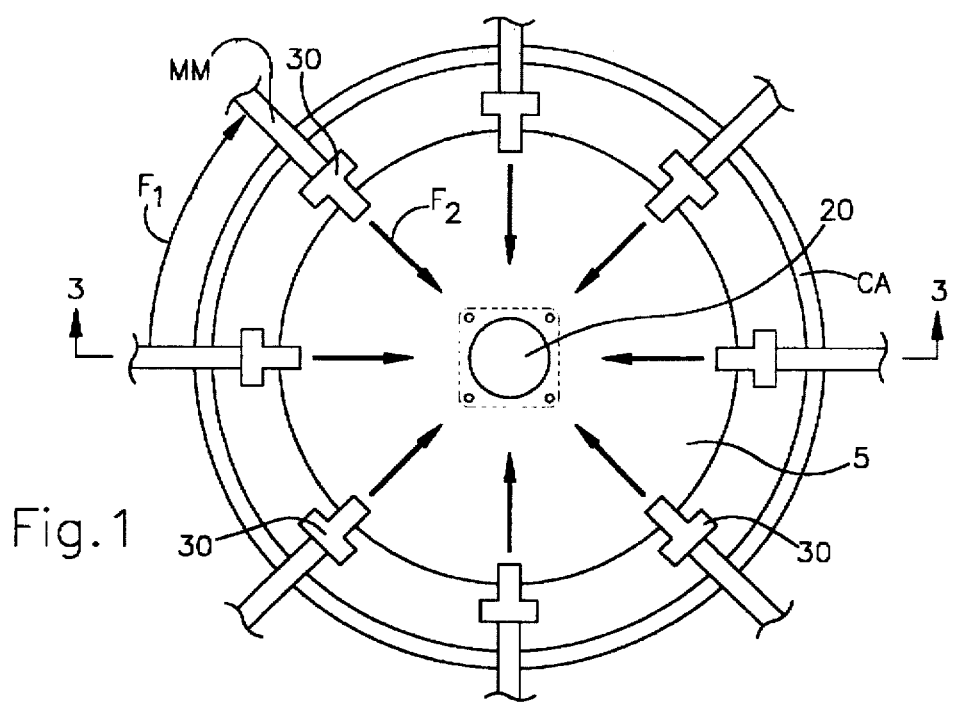
FIG. 1 is a schematic plan view of a gas bag prior to folding, together with clamping means of the device for folding.
Figure 3:
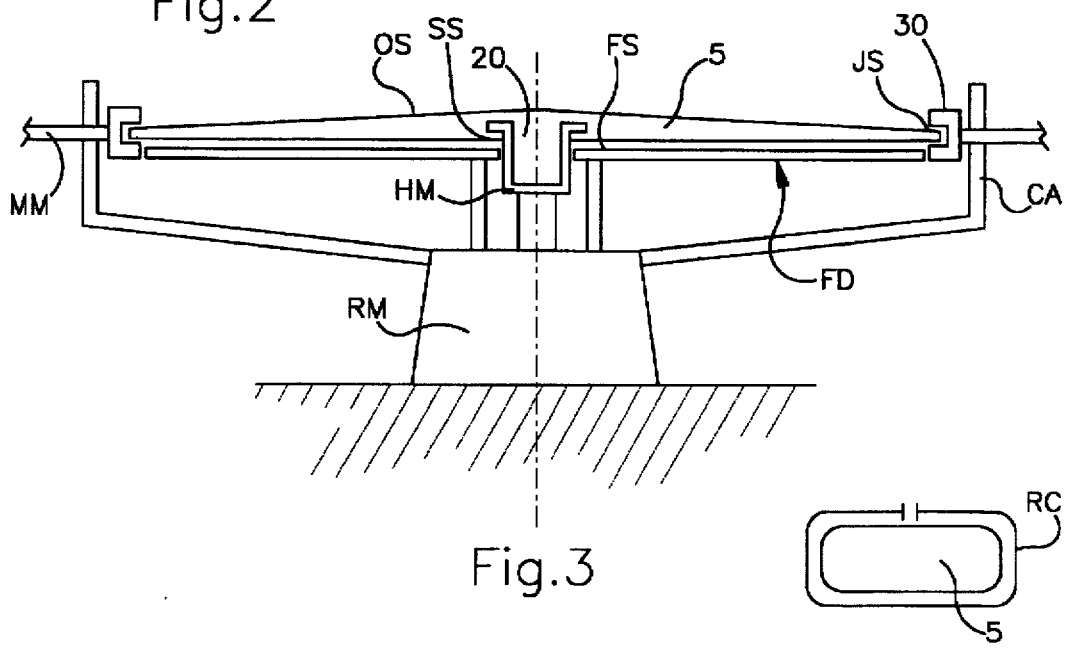
FIG. 3 is a schematic view taken along line 3—3 in FIG. 1.

In FIG. 1, a generally known gas bag 5 is shown, the gas bag having an inflation port 20. The wall of the gas bag 5 comprises a securing section SS (see FIG. 3) on the side of its inflation port 20, a section OS opposite to the securing section SS, and a junction section JS interconnecting peripheral zones of the front and rear walls. In the illustrated embodiment, the junction section JS includes peripheral portions of the front and rear walls.

The gas bag 5 is shown in its deflated, flattened condition in FIG. 1, in which it is spread out on a folding surface FS (FIG. 3) of a folding device FD.

Apart from the folding surface FS, the folding device FD features substantially a holding means HM, capable of holding the securing section SS of the gas bag 5 non-rotatably, as well as a clamping assembly CA substantially comprising clamping means 30 designed to grip the gas bag by its junction section JS at locations stated to be clamping locations.

These clamping means 30 may be known gripping elements, disposed movably on the clamping assembly CA such that they may be moved by a moving means MM in the direction of arrow $F_2$ toward the inflation port 20 of the gas bag 5 and away therefrom. In this arrangement, the clamping means 30 may be so disposed that they are passively movable by a tugging action exerted by the gas bag 5 via the clamping locations on the clamping means or actively by displacement elements. In the embodiment shown, the clamping assembly CA has eight clamping means 30 circumferentially spaced away from each other along the periphery of the gas bag 5 to be folded. When the gas bag 5 to be folded is round, as shown in FIG. 1, the clamping means 30 are disposed in a circular arrangement.

The procedure of the method according to the invention for folding a gas bag is as follows. The gas bag 5 is arranged on the folding surface FS and the holding means HM is affixed to the securing section SS of the gas bag 5. The clamping means 30 grip the junction section JS of gas bag 5 at the clamping locations. This is followed by the clamping assembly CA being turned relatively to the holding means HM by a rotating mans RM, for example in the direction of the arrow $F_1$ in FIG. 1. Due to this turning movement, the outer diameter of the gas bag 5 is reduced, this being the reason why the clamping means 30 holding the as bag needs to follow the gas bag in the direction of the arrow $F_2$ of FIG. 1. This follow-up, which is the function of the moving means MM, may be active or passive.

Figure 2:
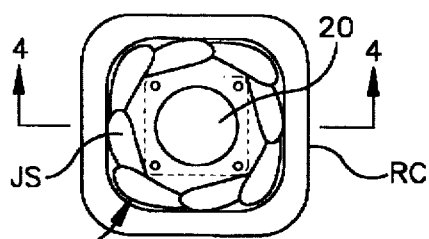
FIG. 2 is a schematic view of the gas bag shown in FIG. 1 after folding.

It will be appreciated that due to the turning movement of the clamping locations along the arrow $F_1$ relatively to the inflation port 20 superimposed with the translational movement along the arrow $F_2$, the clamping locations of the gas bag 5 and thus also the clamping means 30 are moved along a spiral path towards the inflation port 20. Thus, the walls of the gas bag 5 are disposed around the inflation port 20 in a wrapping-type movement. This turning movement may be continued until the gas bag 5 assumes the shape as shown in FIG. 2. It is thus evident that in this folded condition of the gas bag 5 the complete wall of the gas bag 5 is arranged bead-like around the inflation port 20, the clamping locations coming to rest on the outer surface of the folded gas bag.

This turning movement may be continued until the desired packing density of the fold is achieved, a limit to the packing density being dictated substantially only by a possible tear in the fabric.

The method according to the invention may be employed in the same way also for gas bags which in the spread-out condition have a configuration other than circular, as is the case e.g. for a front passenger gas bag. The only difference to the procedure as described above is that, since the arrangement of the clamping means 30 is essentially adapted to the configuration of the gas bag when spread out, in this case the clamping means 30 are not arranged circularly.

Figure 4:
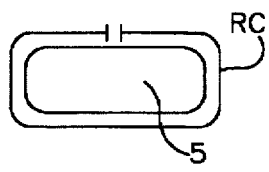
FIG. 4 is a schematic view taken along line 4—4 in FIG. 2.

On completion of folding, the folded gas bag may be deposited in a receiving compartment RC (FIGS. 2 and 4) provided for its accommodation, so that it need not be additionally prevented from unfolding.

The method according to the invention has particularly the advantage that the processing time necessary in executing folding of a gas bag is reduced to a time period in the order of five seconds.

A gas bag 5 which has been folded by the method according to the invention has the advantage that contrary to a gas bag folded according to the prior art, in which a substantial part of the wall of the gas bag is located before the inflation port and thus needs to be moved away from the inflation port by the gas pressure within the gas bag when the latter is inflated, the substantial part of the wall of the gas bag according to the invention is disposed surrounding the inflation port 20 so that the gas flow streaming into the gas bag 5 to inflate it is not first hampered by the wall located to a major extent in front of the inflation port 20.

Contrary to a gas bag folded according to the prior art, which during inflation needs to unfold the many folds implemented in folding, a gas bag 5 according to the invention unfolds itself by the turnings of the wall sections produced during folding being released by being turned in the opposite direction, thus facilitating unfolding of the gas bag 5.

Finally, the gas bag folding device according to the invention has the advantage that the movement implemented by it, which is essentially merely a turning movement, is very much easier to execute than the complicated folding movements of the devices according to the prior art.

From the above description of the invention, those skilled in the art will perceive improvements, changes and modifications. Such improvements, changes and modifications within the skill of the art are intended to be covered by the appended claims.

Having described the invention, the following is claimed:

1. A device for folding an inflatable gas bag for use in a vehicle occupant restraint system, the gas bag including a front wall section and a rear wall section lying opposite the front wall section, the gas bag having an inflated state in which the gas bag has a three dimensional shape and a deflated state in which the gas bag has a flattened shape and lies substantially in a single plane, said device comprising:

holding means for holding stationary only a central wall zone of the rear wall section of the gas bag in the deflated state while the front wall section remains free to move, the central wall zone surrounding an inflation opening defined in the rear wall section of the gas bag;

clamping means for clamping a junction section of the gas bag where peripheral zones of the front and rear wall sections of the gas bag are interconnected, said clamping means clamping the junction section of the gas bag at a plurality of circumferentially spaced locations; and means for rotating said clamping means relative to said holding means for causing an overlying portion of the front wall section of the gas bag overlying the central wall zone of the rear wall section of the gas bag to be rotated relative to the central wall zone wherein the gas bag is folded along a spiral path about an axis substantially normal to said plane.

2. The device of claim 1 further comprising moving means for moving said clamping means radially inward toward the inflation opening in the gas bag while said clamping means is rotated relative to said holding means.

* * * * *